UNITED STATES PATENT OFFICE.

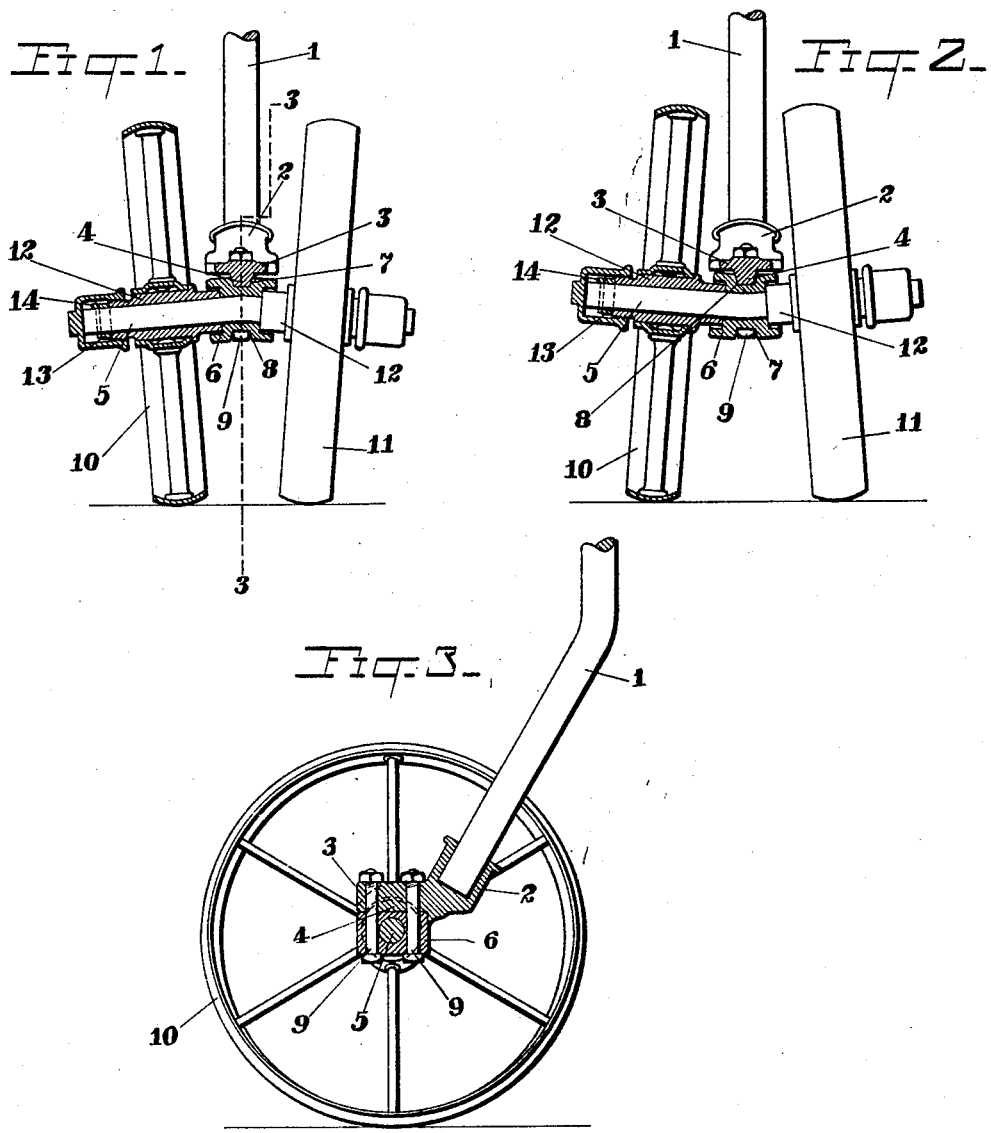

THEOPHILUS BROWN, OF MOLINE, ILLINOIS, ASSIGNOR TO DEERE & COMPANY, OF MOLINE, ILLINOIS, A CORPORATION OF ILLINOIS.

WHEEL FOR LISTERS.

1,318,536.  Specification of Letters Patent.  Patented Oct. 14, 1919.

Application filed February 27, 1918. Serial No. 219,386.

*To all whom it may concern:*

Be it known that I, THEOPHILUS BROWN, a citizen of the United States, residing at Moline, in the county of Rock Island and State of Illinois, have invented certain new and useful Improvements in Wheels for Listers, of which the following is a specification, reference being had therein to the accompanying drawing.

My invention relates to lister plows of a well known type, and more particularly to covering and packing wheels, set at an angle to each other and utilized also as a supporting means for the lister. One of the objects of my invention is to mount the wheels in such a manner that their adjustment for varying conditions of soil can be readily effected.

Referring to the drawings in which similar numerals indicate identical parts—

Figure 1 is a rear view, in part section, of my improvement with the wheels set at a desired angle for a certain condition of soil.

Fig. 2 is a similar view to Fig. 1, with the wheels set in angular relation to each other, the reverse of Fig. 1, and Fig. 3 is a side elevation in section on the line 3—3 of Fig. 1.

In the drawings I have shown the wheels as they are employed at the rear of a lister, 1 being a supporting arm or standard to the lower end of which is secured a member 2 having a rearwardly extending portion 3 provided on its under side, with a central rib 4. A bent axle 5, extending obliquely in opposite directions from its longitudinal center, is rigidly secured, central of its length, in a box 6 which is provided with opposite grooves 7 and 8 in either of which the rib 4 is adapted to be secured by bolts 9, which extend through opposite portions of the box 6 and through the portion 3 of the member 2, securing the parts rigidly together by operation of nuts on the ends of the bolts.

The wheels 10 and 11 are mounted on the axle 5 on opposite sides of the box 6, the latter being recessed to receive the inner ends of the hubs 12. The wheels 10 and 11 rotate upon the axle 5 and are confined thereon by washers 13 and pins 14.

The wheels 10 and 11 not only operate as a partial support for the frame of a lister or planter to which they may be attached, but, as shown in Fig. 1, they also act as coverers and packers for the seed, the inclination of the wheels, converging on the ground, tending to press the soil together over the seed and bed it firmly. The inclination of the wheels 10 and 11 converging downwardly, as shown in Fig. 1, can only be utilized when the ground is friable, it is often the case however that the ground is moist and sticky, adhering to the wheels and to such an extent as to uncover the seed, when this condition is met with, I remove the bolts 9 and reverse the box 6 and the axle 5, the rib 4 engaging with the groove 8. I then insert the bolts 9 and secure the parts together, as shown in Fig. 2, with the wheels 10 and 11 diverging on the ground, so that any clods which may adhere to them as they rotate will not be taken from over the seed.

What I claim is—

1. The combination of a support a member mounted thereon having a rib on its under side, a reversible box secured to said member and provided with opposite grooves to receive said rib, an axle rigidly mounted in said box and extending obliquely from opposite sides thereof, and wheels mounted on the axle and converging downwardly.

2. The combination of a support, a rearwardly extending member mounted thereon having a rib on its under side, a reversible box secured to said member and provided with a groove to receive said rib, a groove on the opposite side of said box to engage with the rib when the box is reversed, an axle rigidly mounted in said box and extending obliquely on opposite sides of the box, and wheels journaled on the axle and converging downwardly, said box and axle adapted to be reversed whereby the wheels are caused to diverge downwardly.

THEOPHILUS BROWN.

Copies of this patent may be obtained for five cents each, by addressing the "Commissioner of Patents, Washington, D. C."